(12) United States Patent
de Rouffignac et al.

(10) Patent No.: US 9,083,012 B2
(45) Date of Patent: Jul. 14, 2015

(54) MEMBRANE ELECTRODE ASSEMBLY HAVING AN ADHESIVE LAYER IMPREGNATING THROUGH AN ELECTROCATALYST LAYER AND INTO A FIRST GAS DIFFUSION SUBSTRATE

(75) Inventors: Catherine Helen de Rouffignac, Oxford (GB); Hubert Gasteiger, Rochester, NY (US); Adam John Hodgkinson, Swindon (GB); Peter Anthony Trew, Wiltshire (GB); Bhaskar Sompalli, Rochester, NY (US); Susan Yan, Fairport, NY (US); Brian Litteer, Henrietta, NY (US)

(73) Assignees: JOHNSON MATTHEY FUEL CELLS LIMITED, London (GB); GENERAL MOTORS CORPORATION, Detroit, MI (US)

( * ) Notice: Subject to any disclaimer, the term of this patent is extended or adjusted under 35 U.S.C. 154(b) by 1921 days.

(21) Appl. No.: 11/663,892

(22) PCT Filed: Sep. 22, 2005

(86) PCT No.: PCT/GB2005/003655
§ 371 (c)(1),
(2), (4) Date: Mar. 26, 2007

(87) PCT Pub. No.: WO2006/032894
PCT Pub. Date: Mar. 30, 2006

(65) Prior Publication Data
US 2008/0090131 A1    Apr. 17, 2008

(30) Foreign Application Priority Data

Sep. 24, 2004  (GB) .................................. 0421254.4

(51) Int. Cl.
*H01M 8/02* (2006.01)
*H01M 8/10* (2006.01)

(52) U.S. Cl.
CPC .......... *H01M 8/0273* (2013.01); *H01M 8/1002* (2013.01); *Y02E 60/521* (2013.01); *Y10T 156/10* (2015.01)

(58) Field of Classification Search
USPC ......... 429/482, 483, 484, 491, 523, 529, 480, 429/534; 427/115
See application file for complete search history.

(56) References Cited

U.S. PATENT DOCUMENTS 5,318,863 A    6/1994  Dhar
5,446,700 A *  8/1995  Iwase ....................... 365/230.06

(Continued)

FOREIGN PATENT DOCUMENTS

EP    0 690 519 A1    1/1996
EP    0 731 520 A1    9/1996

(Continued)

*Primary Examiner* — Raymond Alejandro
(74) *Attorney, Agent, or Firm* — RatnerPrestia

(57) ABSTRACT

A membrane electrode assembly comprises an ion-conducting membrane; a first electrocatalyst layer having a surface facing the membrane; a first electronically-conducting porous gas diffusion substrate facing the other surface of the first electrocatalyst layer; and a first film member interposed between the membrane and the first electrocatalyst layer. The first electrocatalyst layer has an edge region and a central region, and the first film member contacts the edge region and not the central region. A first adhesive layer is present on the surface of the first film member facing the first electrocatalyst layer, and the first adhesive layer adheres the first film member to the first electrocatalyst layer, impregnates through the first electrocatalyst layer, and impregnates into the first gas diffusion substrate.

16 Claims, 5 Drawing Sheets

(56) References Cited

U.S. PATENT DOCUMENTS

| | | | |
|---|---|---|---|
| 5,464,700 A | 11/1995 | Steck et al. | |
| 6,165,634 A * | 12/2000 | Krasij et al. | 429/434 |
| 6,756,147 B1 | 6/2004 | Bronold et al. | |
| 2002/0051902 A1 | 5/2002 | Suenaga et al. | |
| 2003/0003342 A1 * | 1/2003 | Sugita et al. | 429/35 |

FOREIGN PATENT DOCUMENTS

| | | |
|---|---|---|
| EP | 0 875 524 A2 | 11/1998 |
| EP | 1 403 949 A1 | 3/2004 |
| EP | 1 526 593 A1 | 4/2005 |
| WO | WO-00/10216 A1 | 2/2000 |

* cited by examiner (i)

(ii)

(i)

(ii)

(i)

(ii)

(iii)

(i)

(ii)

(i)

(ii)

(iii)

US 9,083,012 B2

MEMBRANE ELECTRODE ASSEMBLY HAVING AN ADHESIVE LAYER IMPREGNATING THROUGH AN ELECTROCATALYST LAYER AND INTO A FIRST GAS DIFFUSION SUBSTRATE

CROSS REFERENCE TO RELATED APPLICATIONS

This application is the U.S. National Phase application of PCT International Application No. PCT/GB2005/003655, filed Sep. 22, 2005, and claims priority of British Patent Application No. 0421254.4, filed Sep. 24, 2004.

FIELD OF THE INVENTION

The present invention relates to a membrane electrode assembly for use in a fuel cell. The invention further relates to catalysed electrodes and catalysed membranes that can be used to prepare membrane electrode assemblies.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications.

In a polymer electrolyte membrane (PEM) fuel cell, the electrolyte is a solid polymer membrane which is electronically insulating but ionically-conducting. Proton-conducting membranes based on perfluorosulphonic acid materials are typically used, and protons, produced at the anode, are transported across the membrane to the cathode, where they combine with oxygen to create water.

The principle component of a polymer electrolyte fuel cell is known as a membrane electrode assembly (MEA) and is essentially composed of five layers. The central layer is the polymer membrane. On either side of the membrane there is an electrocatalyst layer, containing an electrocatalyst. The anode electrocatalyst catalyses the electrochemical oxidation of the fuel, and the cathode electrocatalyst catalyses the electrochemical reduction of oxygen. Finally, adjacent to each electrocatalyst layer there is a gas diffusion substrate. The gas diffusion substrate must allow the reactants to reach the electrocatalyst layer and must conduct the electric current that is generated by the electrochemical reactions. Therefore the substrate must be porous and electrically conducting.

The MEA can be constructed by several methods. The electrocatalyst layer may be applied to the gas diffusion substrate to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane (CCM). Subsequently, gas diffusion substrates are applied to both faces of the catalyst coated membrane. Finally, an MEA can be formed from a membrane coated on one side with an electrocatalyst layer, a gas diffusion substrate adjacent to that electrocatalyst layer, and a gas diffusion electrode on the other side of the membrane.

WO 00/10216 discloses an MEA made from a CCM wherein a sub-gasket is positioned between the catalyst layer and the gas diffusion substrate. EP 1 403 949 discloses an MEA made from a CCM wherein a protective film layer is attached to the membrane and overlaps both the passive area and the active (catalysed) area of the membrane. EP 1 403 949 states that the CCM with the protective film layer offers improved mechanical stability and improved protection against membrane damage. The Examples of EP 1 403 949 demonstrate that the MEAs are durable for 300 hours. The present inventors have sought to further improve the durability of MEAs.

SUMMARY OF THE INVENTION

Accordingly, the present invention provides a membrane electrode assembly comprising
an ion-conducting membrane having first and second surfaces;
a first electrocatalyst layer having first and second surfaces, wherein the first surface of the first electrocatalyst layer faces the first surface of the membrane, and wherein the first surface of the first electrocatalyst layer has an edge region and a central region;
a first electronically-conducting porous gas diffusion substrate having first and second surfaces, wherein the first surface of the first substrate faces the second surface of the first electrocatalyst layer; and
a first film member interposed between the first surface of the membrane and the first surface of the first electrocatalyst layer, such that the first film member contacts the edge region and not the central region of the first surface of the first electrocatalyst layer.

In the membrane electrode assembly of the present invention, the first film member is interposed between the membrane and the electrocatalyst layer whereas in EP 1 403 949 the protective film layer is interposed between the catalyst layer and the gas diffusion substrate. The inventors have found that positioning a film member between the electrocatalyst layer and the membrane, such that an edge region of the electrocatalyst layer is in contact with the film member, provides a membrane electrode assembly with increased durability compared to a membrane electrode assembly wherein the edge region of the electrocatalyst layer is not in contact with a film member.

Suitably the membrane electrode assembly further comprises a second electrocatalyst layer having first and second surfaces, wherein the first surface of the second electrocatalyst layer faces the second surface of the membrane and wherein the first surface of the second electrocatalyst layer has an edge region and a central region. Suitably a second film member is interposed between the second surface of the membrane and the first surface of the electrocatalyst layer such that the second film member contacts the edge region and not the central region of the first surface of the second electrocatalyst layer. Preferably the membrane electrode assembly further comprises a second electronically-conducting porous gas diffusion substrate having first and second surfaces, wherein the first surface of the second substrate faces the second surface of the second electrocatalyst layer.

In a further aspect, the present invention provides a gas diffusion electrode that can be used to manufacture a membrane electrode assembly according to the invention. The gas diffusion electrode comprises
a first electronically-conducting porous gas diffusion substrate having first and second surfaces;
a first electrocatalyst layer having first and second surfaces, wherein the first surface of the first electrocatalyst layer has an edge region and a central region and wherein the second surface of the first electrocatalyst layer faces the first surface of the first substrate; and a first film member contacting the edge region and not the central region of the first surface of the first electrocatalyst layer.

In a further aspect, the present invention provides a catalysed membrane that can be used to manufacture a membrane electrode assembly according to the invention. The catalysed membrane comprises an ion-conducting membrane having first and second surfaces;

a first electrocatalyst layer having first and second surfaces, wherein the first surface of the first electrocatalyst layer faces the first surface of the membrane, and wherein the first surface of the first electrocatalyst layer has an edge region and a central region; and a first film member interposed between the first surface of the membrane and the first surface of the first electrocatalyst layer, such that the first film member contacts the edge region and not the central region of the first surface of the first electrocatalyst layer.

BRIEF DESCRIPTION OF THE DRAWINGS

FIGS. 1-5 show the components in cross-section.

DETAILED DESCRIPTION OF THE INVENTION

Figure 1:
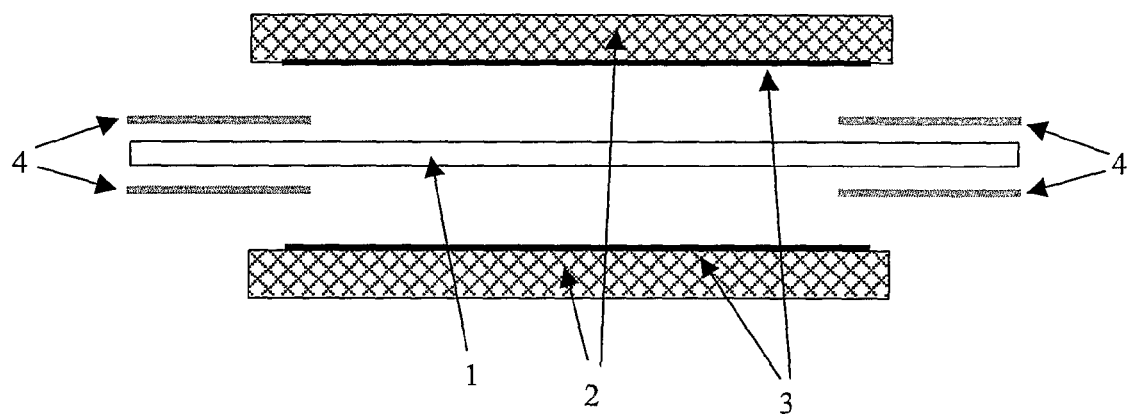
FIG. 1 is a schematic diagram showing a method of producing a membrane electrode assembly according to an embodiment of the invention.
Figure 1:
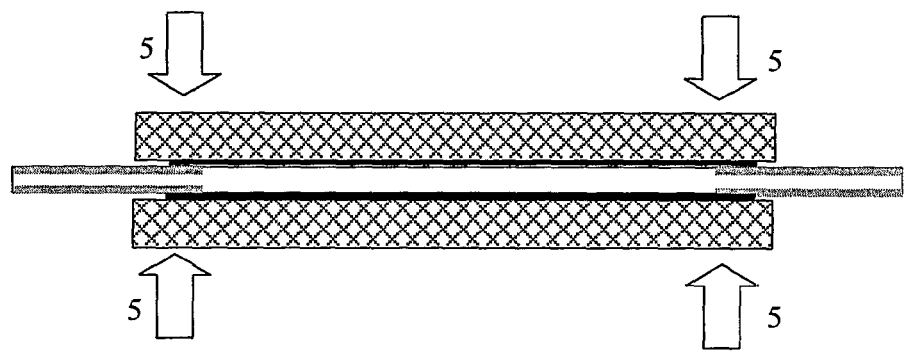

Suitably the catalysed membrane further comprises a second electrocatalyst layer having first and second surfaces, wherein the first surface of the second electrocatalyst layer faces the second surface of the membrane and wherein the first surface of the second electrocatalyst layer has an edge region and a central region. Suitably a second film member is interposed between the second surface of the membrane and the first surface of the electrocatalyst layer such that the second film member contacts the edge region and not the central region of the first surface of the second electrocatalyst layer.

Each of the first and second film members is suitably from 0.1-50 μm thick, preferably from 1-15 μm, most preferably from 4-10 μm. Ideally, the thickness of the film member is similar to the thickness of the electrocatalyst layer. Thinner film members are not preferred as they are unlikely to offer any mechanical protection for the membrane. Thicker film members are not preferred as they may "pinch" the membrane material, leading to membrane thinning and possible membrane failure.

The film material must be stable in the fuel cell environment and suitably has low permeability to hydrogen, oxygen and water. The material is preferably resistant to puncture by fibres from the gas diffusion substrate. The film material may be a polymeric material such as polyethylene terephthalate (PET), polyvinylidene fluoride (PVDF), biaxially-oriented polypropylene (BOPP), polytetrafluoroethylene (PTFE), ethylene tetrafluoroethylene (ETFE), polyether sulphone (PES), polyether ether ketone (PEEK), fluorinated ethylene-propylene (FEP), polyphenylene sulphide (PPS), polyimide (e.g. Kapton™) or polymethyl pentene. Alternatively, the film material could be a metallised film, i.e. a thin layer of metal coated with polymer. Preferably the film material does not impregnate the gas diffusion substrate at the temperatures used to laminate MEAs.

The edge region and the central region together cover the entire first surface of the electrocatalyst layers. Suitably the edge region is the area within 0.5 to 10 mm of the edge of the electrocatalyst layer, preferably within 1 to 5 mm of the edge of the electrocatalyst layer. It is not desirable for the edge region to be larger than this because any electrocatalyst in the edge region is outside the active area of the membrane electrode assembly. The edge region cannot be much smaller than this because it would be difficult to position the film members accurately such that they contacted only the edge region and not the central region.

Each film member suitably comprises a single piece of film material which is preferably cut in a frame shape such that it can contact the entire edge region. Alternatively, a film member may be made up of several strips of film material that together form a frame shape.

In a particular embodiment of the membrane electrode assembly of the invention, the first film member and/or the second film member extend beyond the edges of the gas diffusion substrate(s) and can provide a surface against which a gasket can be positioned.

In preferred embodiments of the membrane electrode assembly, gas diffusion electrode or catalysed membrane, one or more adhesive layers are present on the first film member and optionally on the second film member. An adhesive layer on the surface of the film member facing the membrane will adhere the film member to the membrane. This ensures that there is no leak path (i.e. no route for gas egress) between the membrane and the film member. The adhesive layer may also facilitate stack assembly. If the film layer adheres to membrane that protrudes beyond the edge of the gas diffusion substrates, a rigid film/membrane layer is provided at the edge of the membrane electrode assembly. This film/membrane layer may be handled during stack assembly. An adhesive layer facing the membrane is suitably between 0.1 and 20 μm thick, preferably between 1-15 μm thick, most preferably between 4-10 μm thick.

An adhesive layer on the surface of the film member facing the electrocatalyst layer will adhere the film member to the electrocatalyst layer and will suitably impregnate through the electrocatalyst layer and into the gas diffusion substrate. Impregnating adhesive into the substrate in this way helps to unitise the membrane electrode assembly. The adhesive layer may partially impregnate the gas diffusion substrate or may impregnate throughout the entire thickness of the substrate, including protruding through the far side of the substrate. If the adhesive layer impregnates throughout the entire thickness of the substrate this can seal the edge region of the substrate, stopping gas egress through the edge of the substrate. An adhesive layer facing the electrocatalyst layer is suitably at least 1 μm thick, preferably at least 5 μm thick and may be as thick or thicker than the gas diffusion substrate, e.g. up to 400 μm thick.

The adhesive layer is, for example, a polyethylene-based or polypropylene-based adhesive. The adhesive layer may contain a hot-melt adhesive or a pressure-sensitive adhesive. The adhesive may be a copolymer of ethylene and methacrylic acid or a copolymer of ethylene and vinyl acetate, as described in U.S. Pat. No. 6,756,147. The adhesive is preferably sufficiently fluid to impregnate the substrate. Preferably there is no softening of the adhesive layer at temperatures below 100° C., or below 140° C. if the fuel cell stack is to be operated at high temperature. Preferably the adhesive layer does not shrink appreciably under manufacturing conditions. Suitably the adhesive layer is made of a material that does not leach contaminants into the fuel cell system.

In an embodiment wherein an adhesive layer impregnates the substrate and wherein the film member extends beyond the edge of the gas diffusion substrate, the adhesive layer extending beyond the substrate forms a suitable surface on which a gasket member can be positioned. Alternatively, in an embodiment wherein an adhesive layer impregnates through the entire thickness of the substrate and wherein the film member does not extend beyond the edge of the gas diffusion substrate, the impregnated substrate forms a suitable surface on which a gasket member can be positioned.

In an embodiment wherein an adhesive layer impregnates only part way through the thickness of the substrate, the remaining portion of the substrate (i.e. the portion between the region impregnated by adhesive and the second surface of the substrate) may be impregnated with an elastomeric material. Suitable elastomeric materials include silicones, fluorosilicones, fluoroelastomers (e.g. Viton™), EPDM (ethylene propylene diene monomer) rubbers, thermoplastic elastomers (e.g. styrene-butadiene block copolymer) and liquid crystal polymer elastomers. The elastomeric material may also be present on the second surface of the substrate and may form gasketing members.

The ion-conducting membrane may be any type of ion-conducting membrane known to those skilled in the art. Suitably the membrane is proton-conducting. In state of the art membrane electrode assemblies, the membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 875 524. The membrane is suitably less than 200 μm thick, preferably less than 50 μm thick.

The gas diffusion substrates may be any suitable gas diffusion substrates known to those skilled in the art. Typical substrates include substrates based on carbon paper (eg Toray® paper available from Toray Industries, Japan), woven carbon cloths (eg Zoltek® PWB-3 available from Zoltek Corporation, USA) or non-woven carbon fibre webs (eg Optimat 203 available from Technical Fibre Products, UK). The carbon substrate is typically modified with a particulate material either embedded within the substrate or coated onto the planar faces, or a combination of both. The particulate material is typically a mixture of carbon black and a polymer such as polytetrafluoroethylene (PTFE). Suitably the gas diffusion substrates are between 100 and 300 μm thick. Preferably there is a layer of particulate material such as carbon black and PTFE on the first face of the gas diffusion substrate.

The electrocatalyst layers comprise an electrocatalyst which may be a finely divided metal powder (metal black), or may be a supported catalyst wherein small metal particles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals such as ruthenium, or base metals such as molybdenum or tungsten. If the electrocatalyst is a supported catalyst, the loading of metal particles on the carbon support material is suitably in the range 10-100 wt %, preferably 15-75 wt %.

The electrocatalyst layers suitably comprise other components, such as ion-conducting polymer, which is included to improve the ionic conductivity within the layer.

The surface area of the gas diffusion substrates is suitably at least as large as the surface area of the electrocatalyst layers and may be larger. The surface area of the membrane is suitably at least as large as the surface area of the electrocatalyst layers and may be larger. The surface area of the membrane may be smaller than, the same size as, or larger than the surface area of the gas diffusion substrates. If the surface area of the membrane is smaller than the surface area of the gas diffusion substrates it is necessary to seal the region between the substrates where there is no membrane, e.g. using an adhesive layer on the faces of the film members facing the membrane.

The invention further provides a method of producing a membrane electrode assembly comprising the following steps:
  a) taking an ion-conducting membrane having first and second surfaces; a first electrocatalyst layer having first and second surfaces, wherein the first surface of the first electrocatalyst layer has an edge region and a central region; a first electronically-conducting porous gas diffusion substrate having first and second surfaces; and a first film member;
  b) positioning the ion-conducting membrane such that the first surface of the membrane faces the first surface of the first electrocatalyst layer;
  c) positioning the first substrate such that the first surface of the first substrate faces the second surface of the first electrocatalyst layer; and
  d) positioning the first film member such that the first film member is interposed between the first surface of the membrane and the first surface of the first electrocatalyst layer, such that the first film member contacts the edge region and not the central region of the first surface of the first electrocatalyst layer.

Steps (b), (c) and (d) can be carried out in any order. Suitably the method further comprises steps (e) and (f), and preferably further comprises steps (e), (f) and (g):
  e) taking a second electrocatalyst layer having first and second surfaces, and wherein the first surface of the second electrocatalyst layer has an edge region and a central region and positioning the second electrocatalyst layer such that the first surface of the second electrocatalyst layer faces the second surface of the membrane;
  f) taking a second film member and positioning the second film member such that the second film member is interposed between the second surface of the membrane and the first surface of the electrocatalyst layer such that the second film member contacts the edge region and not the central region of the first surface of the second electrocatalyst layer; and g) taking a second electronically-conducting porous gas diffusion substrate having first and second surfaces and positioning the second gas diffusion substrate such that the first surface of the second substrate faces the second surface of the second electrocatalyst layer.

Steps (b) to (f) or steps (b) to (g) may be carried out in any order. The method (whether it comprises steps (a)-(d), (a)-(f) or (a)-(g)) preferably comprises a final step of h) laminating together the ion-conducting membrane, electrocatalyst layer(s), gas diffusion substrate(s) and film member(s).

The invention further provides a method of producing a gas diffusion electrode according to the invention comprising the following steps:

m) taking a first electrocatalyst layer having first and second surfaces, wherein the first surface of the first electrocatalyst layer has an edge region and a central region; a first electronically-conducting porous gas diffusion substrate having first and second surfaces; and a first film member;

n) positioning the first substrate such that the first surface of the first substrate faces the second surface of the first electrocatalyst layer; and o) contacting the first film member with the edge region and not the central region of the first surface of the first electrocatalyst layer.

A membrane electrode assembly according to the invention may be prepared using a gas diffusion electrode according to the invention. An ion-conducting membrane having first and second surfaces is positioned such that the first surface of the membrane faces the first surface of the first electrocatalyst layer of the gas diffusion electrode. Preferably the ion-conducting membrane is positioned between two gas diffusion electrodes according to the invention such that each surface of the membrane faces the first surface of an electrocatalyst layer of a gas diffusion electrode according to the invention. Most preferably the one or two gas diffusion electrodes are laminated to the membrane.

The invention further provides a method of producing a catalysed membrane according to the invention comprising the following steps:

t) taking an ion-conducting membrane having first and second surfaces; a first electrocatalyst layer having first and second surfaces, wherein the first surface of the first electrocatalyst layer has an edge region and a central region; and a first film member;

u) positioning the ion-conducting membrane such that the first surface of the first electrocatalyst layer faces the first surface of the membrane; and v) positioning the first film member such that the first film member is interposed between the first surface of the membrane and the first surface of the first electrocatalyst layer, such that the first film member contacts the edge region and not the central region of the first surface of the first electrocatalyst layer.

Steps (u) and (v) can be carried out in any order. Suitably the method further comprises steps (w) and (x):

w) taking a second electrocatalyst layer having first and second surfaces, and wherein the first surface of the second electrocatalyst layer has an edge region and a central region and positioning the second electrocatalyst layer such that the first surface of the second electrocatalyst layer faces the second surface of the membrane; and x) taking a second film member and positioning the second film member such that the second film member is interposed between the second surface of the membrane and the first surface of the electrocatalyst layer such that the second film member contacts the edge region and not the central region of the first surface of the second electrocatalyst layer.

Steps (u) to (x) may be carried out in any order.

A membrane electrode assembly according to the invention may be prepared using a catalysed membrane according to the invention. One or two gas diffusion substrates having first and second surfaces are positioned such that the first surface(s) of the gas diffusion substrate(s) face the second surface(s) of the electrocatalyst layer(s) of the catalysed membrane. Preferably the gas diffusion substrate(s) are laminated to the catalysed membrane.

Techniques for combining electrocatalyst layers, gas diffusion substrates and membranes to form gas diffusion electrodes, catalysed membranes and membrane electrode assemblies are within the competence of the person skilled in the art. Electrocatalyst layers may be applied to substrates or membranes by direct techniques such as spraying or printing, or by indirect techniques such as decal transfer. Catalysed membranes may be combined with gas diffusion substrates by standard lamination techniques. Gas diffusion electrodes may be combined with membranes by standard lamination techniques.

Step (i) of FIG. 1 shows a membrane (1) positioned between gas diffusion electrodes made up of gas diffusion substrates (2) and electrocatalyst layers (3). The electrocatalyst layers (3) may be applied to the gas diffusion substrates (2) by any known techniques such as printing or spraying. The membrane (1) extends beyond the substrates (2). Film members (4) are positioned between the membrane (1) and the electrodes (2,3) such that they face edge regions of the electrocatalyst layers (3). In step (ii) the membrane (1) is laminated to the electrodes (2,3) by pressing in the direction shown by arrows (5). The film members (4) are between the membrane (1) and the electrocatalyst layers (3), contacting an edge region of the electrocatalyst layers (3).

Figure 2:
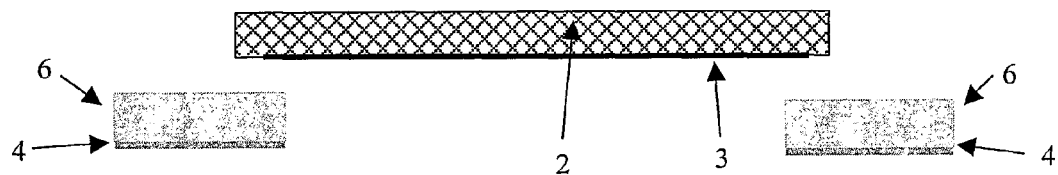
FIG. 2 is a schematic diagram showing a method of producing a gas diffusion electrode according to an embodiment of the invention.
Figure 2:
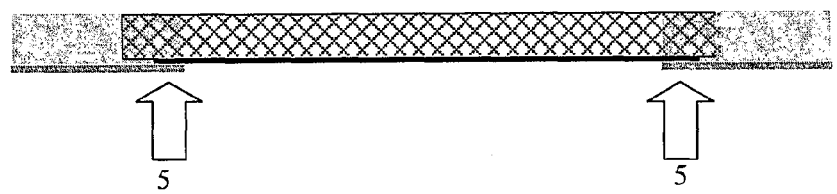

Step (i) of FIG. 2 shows a gas diffusion electrode made up of a gas diffusion substrate (2) and an electrocatalyst layer (3). The electrocatalyst layer (3) may be applied to the substrate (2) by any known technique such as spraying or printing. A film member (4) bears an adhesive layer (6) and is positioned such that it faces the edge region of the electrocatalyst layer (3), with the adhesive layer (6) facing the electrocatalyst layer (3). In step (ii), the film member (4) is laminated to the electrode (2, 3) by pressing in the direction shown by arrows (5). The adhesive impregnates the substrate (2). The film member (4) contacts the edge region of the electrocatalyst layer (3).

Figure 3:
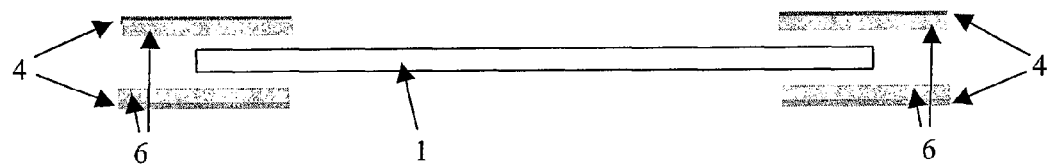
FIG. 3 is a schematic diagram showing a method of producing a catalysed membrane according to an embodiment of the invention.
Figure 3:
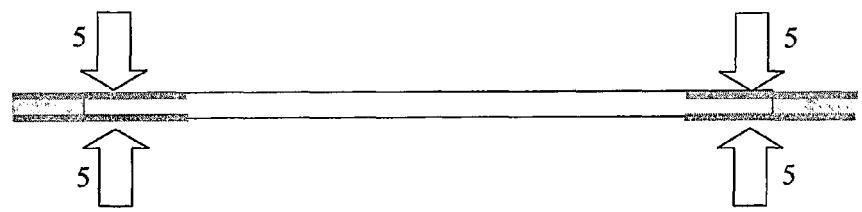
Figure 3:
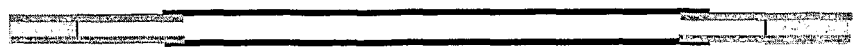

Step (i) of FIG. 3 shows a membrane (1) and film members (4) bearing adhesive layers (6). The adhesive layers (6) face the membrane (1). In step (ii), the film members (4) are laminated to the membrane (1) be pressing in the directions shown by arrows (5). The adhesive sticks to the film members (4) to the membrane (1) and fills in the gap between the two film members (4). In step (iii), electrocatalyst layers (3) are applied to the membrane (1). The electrocatalyst layers (3) may be applied by any known technique such as spraying or printing. The electrocatalyst layers (3) overlap the film members (4) such that the film members (4) are interposed between the membrane (1) and the edge region of the electrocatalyst layers (3).

Figure 4:
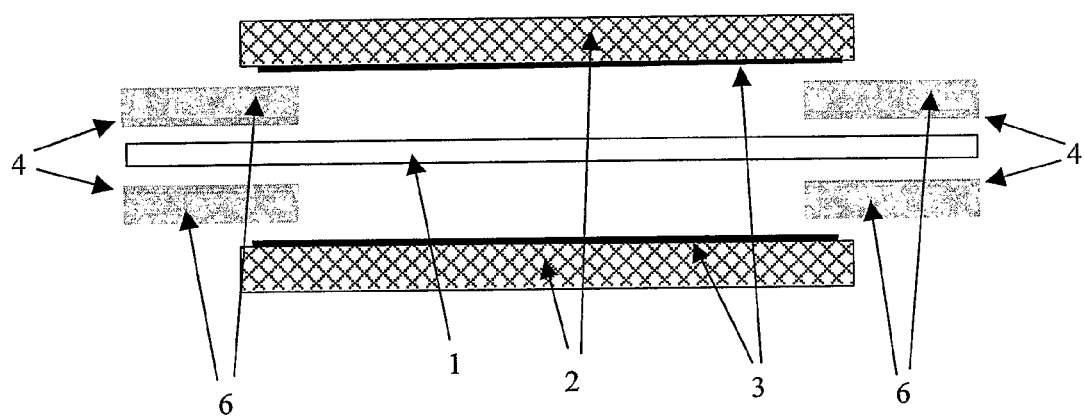
FIG. 4 is a schematic diagram showing a method of producing a membrane electrode assembly according to an embodiment of the invention.
Figure 4:
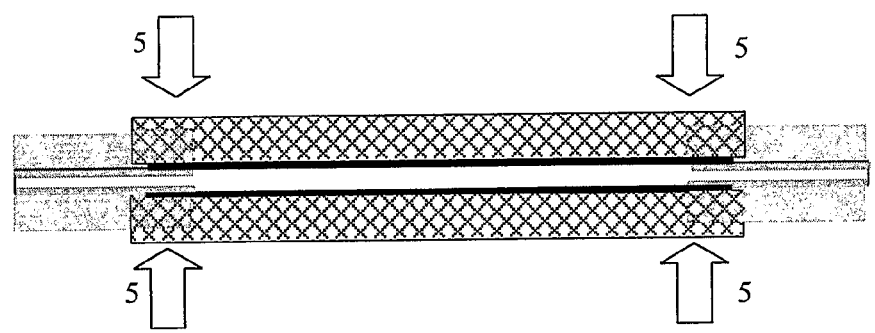

Step (i) of FIG. 4 shows a membrane (1) and gas diffusion electrodes made up of gas diffusion substrates (2) and electrocatalyst layers (3). The electrocatalyst layers (3) may be applied to the gas diffusion substrates (2) by any known techniques such as printing or spraying. The membrane (1) extends beyond the substrates (2). Film members (4) comprising adhesive layers (6) are positioned between the membrane (1) and the electrodes (2,3) and face the edge regions of the electrocatalyst layers (3). In step (ii) the membrane (1) is laminated to the electrodes (2,3) by pressing in the direction shown by arrows (5). The adhesive layer (6) impregnates the gas diffusion substrates (2). The film members (4) are between the membrane (1) and the electrocatalyst layers (3), contacting an edge region of the electrocatalyst layers (3).

Figure 5:
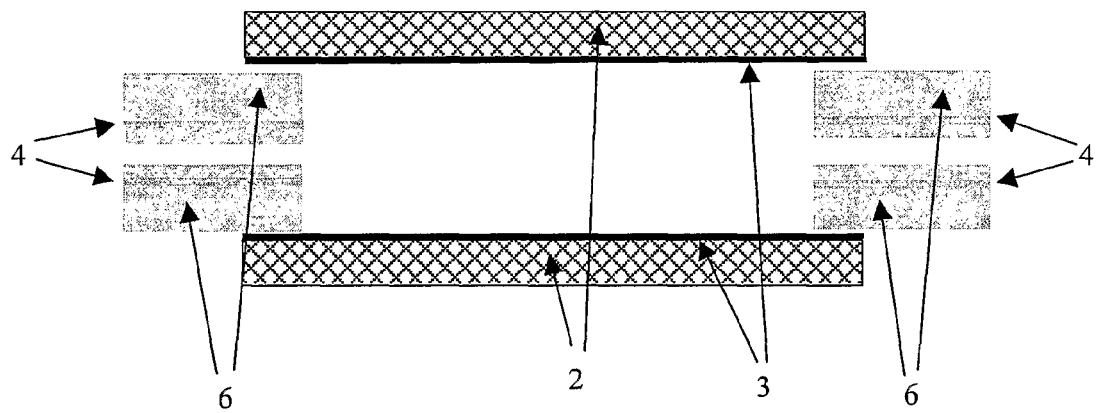
FIG. 5 is a schematic diagram showing a method of producing a membrane electrode assembly according to an embodiment of the invention.
Figure 5:
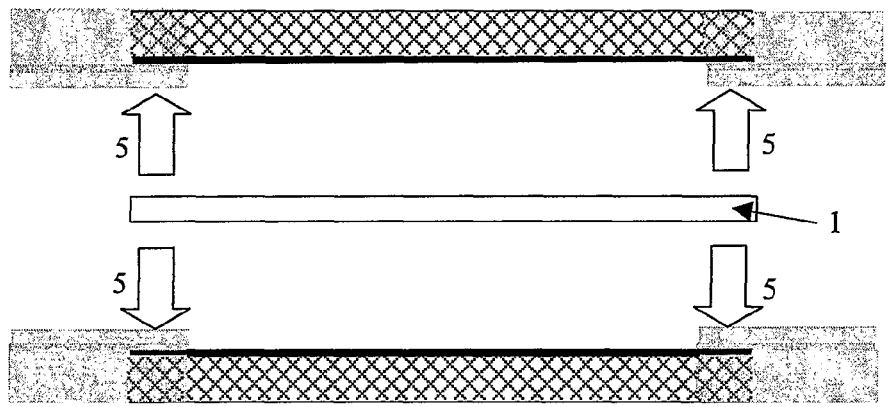
Figure 5:
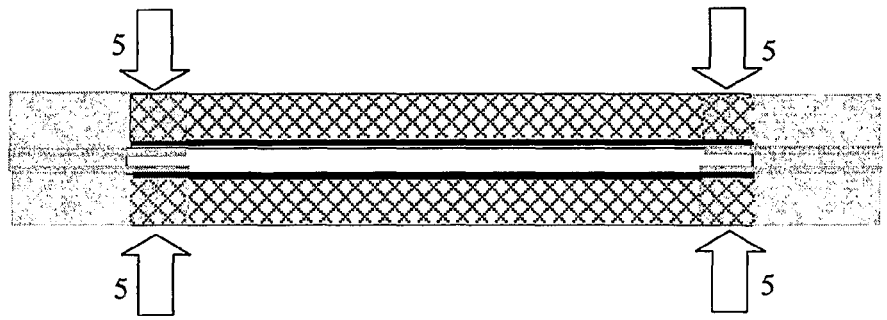

Step (i) of FIG. 5 shows gas diffusion electrodes made up of gas diffusion substrates (2) and electrocatalyst layers (3). The electrocatalyst layers (3) may be applied to the gas diffusion substrates (2) by any known techniques such as printing or spraying. Film members (4) comprising adhesive layers (6) on both faces of the film members are positioned adjacent to the edge regions of the electrocatalyst layers (3). In step (ii) the film members (4) are laminated to the electrodes (2,3) by pressing in the direction shown by arrows (5). It may be necessary to position release films between the press and the adhesive layer during the lamination step. The adhesive layers (6) impregnate the gas diffusion substrates (2). The film members (4) contact an edge region of the electrocatalyst layers (3). A membrane (1) is positioned between the gas diffusion electrodes (2,3). In step (iii) the gas diffusion electrodes (2,3) are laminated to the membrane (1) by pressing in the direction shown by arrows (5). The adhesive layers (6) stick the film members (4) to the membrane (1) and fill in the gaps between the two film members (4).

The invention will now be described by reference to examples that are illustrative and not limiting of the invention.

EXAMPLES

MEA Preparation

Seven MEAs were prepared. The gas diffusion substrates were Toray® paper coated on one surface with a mixture of carbon black and PTFE. The membranes were 25 μm Aciplex® perfluorosulphonic acid polymer membranes. The catalyst layers contained 40 wt % platinum on carbon catalysts and perfluorosulphonic acid polymer. Catalyst layers were applied to the coated surfaces of the gas diffusion substrates using catalyst inks prepared as outlined in EP 731 520. The components of the MEAs were laminated together by hot pressing pressures of 230-250 psi and temperatures of 150-190° C. The film members in the MEAs, the methods of incorporating the film members into the MEA and the position of the film members in the MEA were as follows:

| | Film Member | Method | Position |
|---|---|---|---|
| Comparative Example 1 | None. | N/A. | N/A. |
| Comparative Example 2 | None. | N/A. | N/A. |
| Comparative Example 3 | 12 μm PET film with 30 μm polyethylene EVA copolymer adhesive layer. | Gas diffusion electrodes, membrane and films were laminated in a single step. | Films did not contact the catalyst layers. Adhesive impregnated electrodes. |
| Example 1 | 12 μm PET film with 30 μm polyethylene EVA copolymer adhesive layer. | Films were laminated to gas diffusion electrodes. Electrodes were subsequently laminated to the membrane. | Films contacted a 2 mm edge region of the catalyst layers. Adhesive impregnated electrodes. |
| Example 2 | 4.5 μm PVDF film. | Gas diffusion electrodes, membrane and films were laminated in a single step. | Films contacted a 2 mm edge region of the catalyst layers. |
| Example 3 (Repeat of Example 1) | 12 μm PET film with 30 μm polyethylene EVA copolymer adhesive layer. | Films were laminated to gas diffusion electrodes. Electrodes were subsequently laminated to the membrane. | Films contacted a 2 mm edge region of the catalyst layers. Adhesive impregnated electrodes. |
| Example 4 | 12 μm BOPP film between two 12 μm polyethylene EVA copolymer adhesive layers. | Gas diffusion electrodes, membrane and films were laminated in a single step. | Films contacted a 2 mm edge region of the catalyst layers. Adhesive impregnated electrodes and adhesive bonded films to membrane. |

Durability Testing

The durability of the seven MEAs was tested by measuring the gas cross-over of the membranes over time in a single fuel cell durability test. A cyclic test protocol was used wherein the current density was held a different levels for periods of time. The gas crossover was measured with the sample in the test cell and no current being drawn from the cell. A gas pressure of 5 psi was applied to one side of the cell and no pressure to the other side. The un-pressurised side was connected to one end of a polymer tube, the other end of which was immersed in a bucket of water. An inverted measuring cylinder, initially full of water, was positioned over the immersed end of the tube and used to catch any gas bubbles that emerge from the tube end as a result of gas crossover through the MEA. Gas was collected over a period of several minutes and the result expressed in ml/minute. The volume of gas crossover indicates the extent of membrane perforation within the MEA, a higher volume indicating worse perforation, since it is the membrane that separates the anode and cathode gas streams. The gas cross over rate is thus a direct indicator of actual MEA durability. The longer an MEA runs with low gas crossover, the better are its chances of providing durable service.

Figure 6:
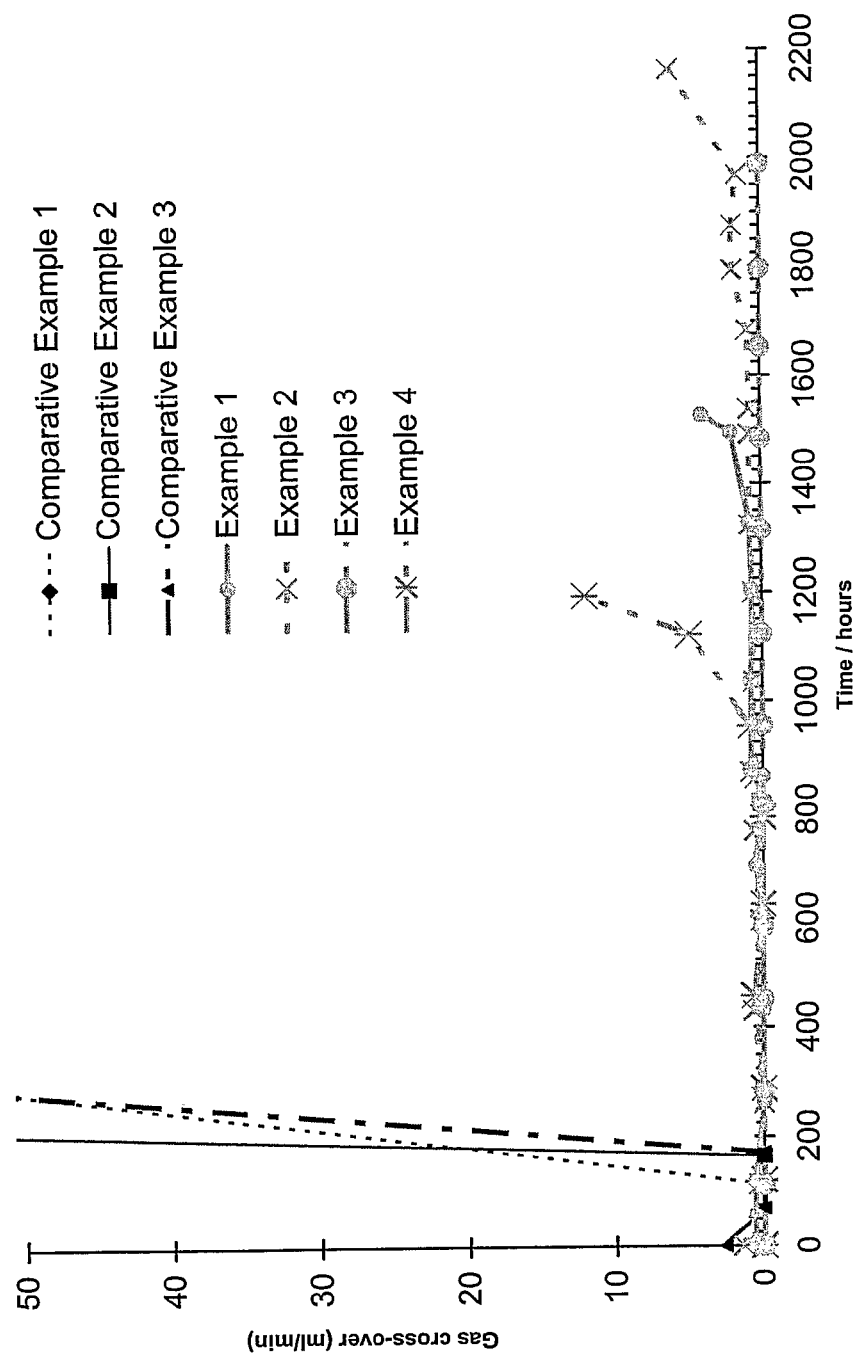
FIG. 6 is a graph showing gas cross-over versus time for the MEAs of the examples and comparative examples.

FIG. 6 shows the results of the gas cross-over testing. Comparative examples 1 and 2 (having no film member) and comparative example 3 (wherein the film member did not overlap the catalyst layer) show significant gas cross-over at less than 400 hours, so do not have good durability. Examples 1-4 all show durability of at least 1000 hours, and several of the examples show durability of 2000 hours. The improved durability is achieved with film members bearing no adhesive layers (example 2), one adhesive layer (examples 1 and 3) and two adhesive layers (example 4).

The invention claimed is:

1. A membrane electrode assembly comprising:
    an ion-conducting membrane having first and second surfaces;
    a first electrocatalyst layer having first and second surfaces, wherein the first surface of the first electrocatalyst layer faces the first surface of the membrane, and wherein the first surface of the first electrocatalyst layer has an edge region and a central region;
    a first electronically-conducting porous gas diffusion substrate having first and second surfaces, wherein the first surface of the first substrate faces the second surface of the first electrocatalyst layer; and
    a first film member interposed between the first surface of the membrane and the first surface of the first electrocatalyst layer, such that the first film member contacts the edge region and not the central region of the first surface of the first electrocatalyst layer,
    a first adhesive layer present on a surface of the first film member facing the first electrocatalyst layer,
    wherein: (1) the first adhesive layer adheres the first film member to the first electrocatalyst layer, impregnates through the first electrocatalyst layer and impregnates into the first gas diffusion substrates; (2) the first electrocatalyst layer overlaps the first film member such that the first film member is interposed between the ion conducting membrane and the edge region of the first electrocatalyst layer; and (3) the first adhesive layer impregnates through the first electrocatalyst layer at the edge region and in a direction extending perpendicular to the first and second surfaces of the first electrocatalyst layer and impregnates into the first gas diffusion substrate at the edge region and in a direction extending perpendicular to the first and second surfaces of the first gas diffusion substrate.

2. The membrane electrode assembly according to claim 1, further comprising
    a second electrocatalyst layer having first and second surfaces, wherein the first surface of the second electrocatalyst layer faces the second surface of the membrane and wherein the first surface of the second electrocatalyst layer has an edge region and a central region;
    a second electronically-conducting porous gas diffusion substrate having first and second surfaces, wherein the first surface of the second gas diffusion substrate faces the second surface of the second electrocatalyst layer; and
    a second film member interposed between the second surface of the membrane and the first surface of the second electrocatalyst layer, such that the second film member contacts the edge region and not the central region of the first surface of the second electrocatalyst layer.

3. The membrane electrode assembly according to claim 1, wherein the edge region on the first surface of the first electrocatalyst layer is the area within 0.5 to 10 mm of the edge of the first electrocatalyst layer.

4. The membrane electrode assembly according to claim 2, wherein the edge region on the first surface of the second electrocatalyst layer is the area within 0.5 to 10 mm of the edge of the second electrocatalyst layer.

5. The membrane electrode assembly according to claim 1, further comprising a second adhesive layer present on a surface of the first film member that faces the membrane, and wherein the second adhesive layer adheres the first film member to the membrane.

6. The membrane electrode assembly according to claim 2, wherein a second adhesive layer is present on a surface of the first film member that faces the membrane, and the second adhesive layer adheres the first film member to the membrane.

7. The membrane electrode assembly according to claim 2, further comprising a second adhesive layer present on a surface of the second film member that faces the first surface of the second electrocatalyst layer, and wherein the second adhesive layer adheres the second film member to the second electrocatalyst layer, impregnates through the second electrocatalyst layer and impregnates into the second gas diffusion substrate.

8. The membrane electrode assembly according to claim 6, further comprising a third adhesive layer present on a surface of the second film member that faces the first surface of the second electrocatalyst layer, and wherein the third adhesive layer adheres the second film member to the second electrocatalyst layer, impregnates through the second electrocatalyst layer and impregnates into the second gas diffusion substrate.

9. The membrane electrode assembly according to claim 7, further comprising a third adhesive layer present on a surface of the second film member that faces the membrane, and wherein the third adhesive layer adheres the second film member to the membrane.

10. The membrane electrode assembly according to claim 8, further comprising a fourth adhesive layer present on a surface of the second film member that faces the membrane, and wherein the fourth adhesive layer adheres the second film member to the membrane.

11. The membrane electrode assembly according to claim 1, wherein the first film member comprises a polymeric material or a metallised film.

12. The membrane electrode assembly according to claim 11, wherein the first film member comprises the metallised film and the metallised film is a layer of metal coated with a polymer.

13. The membrane electrode assembly according to claim 1, wherein the ion-conducting membrane comprises a perfluorinated sulphonic acid material.

14. The membrane electrode assembly according to claim 1, wherein the gas diffusion substrate comprises carbon paper, carbon cloths, or a non-woven carbon fibre web.

15. The membrane electrode assembly according to claim 1, wherein the first electrocatalyst layer comprises a platinum group metal or an alloy thereof.

16. The membrane electrode assembly according to claim 1, wherein the first electrocatalyst layer comprises platinum alloyed with another precious metal or a base metal.

* * * * *